Figure 1:
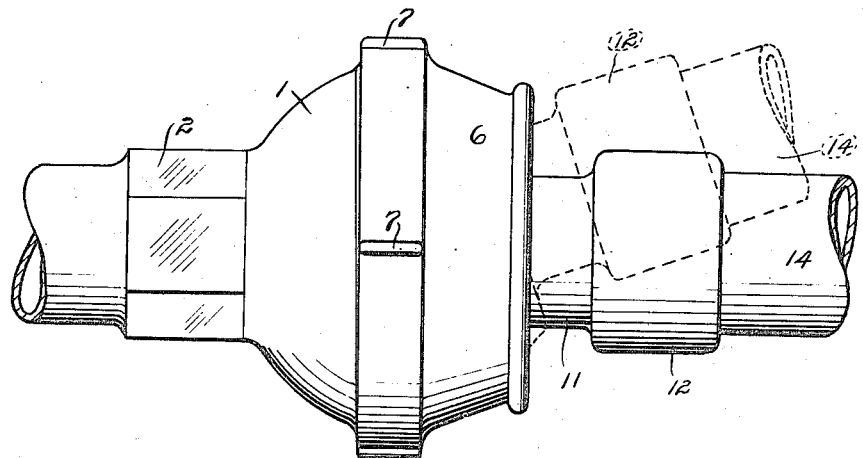

J. J. REYNOLDS.
FLEXIBLE PIPE JOINT.
APPLICATION FILED JAN. 22, 1921.

1,434,631.

Patented Nov. 7, 1922.

INVENTOR:
James J. Reynolds.
BY John C. Higdon
ATT'Y.

Patented Nov. 7, 1922.

1,434,631

UNITED STATES PATENT OFFICE.

JAMES J. REYNOLDS, OF ST. LOUIS, MISSOURI.

FLEXIBLE PIPE JOINT.

Application filed January 22, 1921. Serial No. 439,201.

*To all whom it may concern:*

Be it known that I, JAMES J. REYNOLDS, a citizen of the United States, residing at St. Louis, in the State of Missouri, have invented certain new and useful Improvements in Flexible Pipe Joints, of which the following is a specification containing a full, clear, and exact description, reference being had to the accompanying drawings, forming a part hereof.

My invention consists in the novel construction and combination of parts hereinafter particularly described and distinctly claimed.

The object of my invention is to provide an improved flexible pipe-joint which shall be very simple in construction, as well as of low cost; but which shall be highly efficient and durable in the various uses to which flexible pipe-joints are adapted, such as carrying steam under high or low pressure, or water, oil or other liquids or gases, and air, under high or low pressure.

Figure 2:
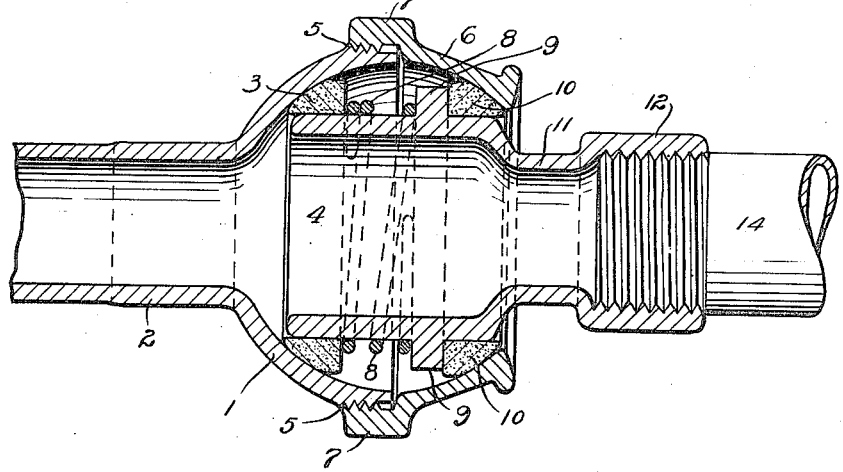

In the drawings,

Fig. 1 is a side-elevation of a flexible pipe-joint constructed in accordance with my invention, and Fig. 2 is a longitudinal section of the same.

The numeral 1 designates the main socket member, constructed with an external hub 2 which is hexagonal or otherwise formed on its exterior to be engaged by a common wrench, and to which a common section of pipe or hose (not shown) may be connected during use.

Said main socket-member 1 is substantially semispherical in form, and is finished smoothly upon its interior to receive the gasket 3 that is carried by one end of the ball-member 4.

The outer periphery of the said main socket-member 1 is screw-threaded at 5, and the internally-threaded open socket-section 6 is adjustably mounted upon said screw-threaded periphery of said main socket-member, the periphery of said open socket-section being provided with projecting lugs 7, to be engaged by a common spanner or wrench, if necessary, in tightening or loosening the threaded parts.

Mounted within the socket formed by said main socket-member 1 and the open socket-section 6 is the said ball-member 4, which (in the present illustration of my invention) is cylindrical so that the said gasket 3 may be automatically adjusted thereon, and yieldingly held in close contact with the adjacent inner surface of said main socket-member 1, by some suitable resilient or elastic device, such as a coiled-spring 8, or the mechanical equivalent thereof which is also mounted to slide on said ball-member in the space between said gasket 3 and an annular flange (or abutment) 9 fixed upon or formed integral with said ball-member.

Another gasket 10, which may be identical in size and material with the said gasket 3, is located on said ball-member 4 in the space between said annular flange or shoulder 9 and the adjacent inner surface of the said socket-section 6, and a close contact and tight joint between the latter and said gasket 10 is automatically maintained at all times by the expansive power of the said spring 8 (or its equivalent), which urges the two gaskets apart, and makes a tight joint between said gaskets and the inner surfaces of the socket walls, as well as compresses both gaskets into a tight joint with the outer periphery of said cylindrical ball-member 4.

The said two gaskets, 3 and 10, act as two relatively movable halves of a ball, which are automatically urged into close contact with the internal surfaces of the socket walls, by a spring 8, or the equivalent thereof which is located in the space between said ball-halves and urges them apart, as previously described.

Said cylindrical ball-member 4 is, of course, tubular, to permit the free passage of the liquid or fluid, and it is formed with an integral reduced neck 11 at its outer end, extending through the open outer end of the said socket-section 6, so that said ball-member, its reduced neck, and the pipe connection 12 at the outer end of the latter, may be swung at any desired angle, as indicated by dotted lines in Fig. 1.

Common pipe 14 may be threaded into, or otherwise connected to, the said pipe connection 12, and a hose (not shown) may be slipped over the free end of said pipe, when it is desired to use my pipe-coupling in connection with hose.

The operation of my invention will be readily understood without farther description.

The two gaskets, 3 and 10, are preferably made of the material commercially known as "composition," although they may be made of any other material adapted to the purpose of making a tight joint in flexible pipe-couplings carrying high-pressure steam, hot water, air, oil, or other liquid or fluids, especially natural gas.

The said gaskets 3 and 10 act, as previously stated, as the two separated relatively-movable halves of a ball.

I claim:—

A flexible pipe-joint, comprising two socket-parts separably united at their inner ends; a pipe-connection at the outer end of one of said socket parts; a straight tubular ball-member having a pipe-connection at its outer end; a fixed abutment located on the outer surface of said straight tubular ball-member, upon the interior of said socket-parts; two separated gaskets located on the exterior of said tubular ball-member, to make a tight joint therewith, and also with the adjacent internal walls of said socket-parts, said fixed abutment being located in the space between said gaskets; and a coiled spring mounted on said tubular ball-member, in the space betwen said abutment and one of said gaskets, and arranged to yieldingly force said gaskets in opposite directions, and retain them in contact with the inner surfaces of said socket-parts.

In testimony whereof, I have signed my name to this specification in presence of two subscribing witnesses.

JAMES J. REYNOLDS.

Witnesses:
FRANCES E. MORRIS,
JOHN C. HIGDON.